(12) United States Patent  
Dahl et al.

(10) Patent No.: US 8,567,018 B2
(45) Date of Patent: Oct. 29, 2013

(54) LINKABLE ROPE ASSEMBLY

(76) Inventors: Jeffery Dahl, Medford, OR (US); Daniel Paul Hawkins, Jacksonville, OR (US)

( * ) Notice: Subject to any disclaimer, the term of this patent is extended or adjusted under 35 U.S.C. 154(b) by 312 days.

(21) Appl. No.: 12/831,224

(22) Filed: Jul. 6, 2010

(65) Prior Publication Data

US 2011/0158760 A1 Jun. 30, 2011

Related U.S. Application Data

(63) Continuation-in-part of application No. 12/647,318, filed on Dec. 24, 2009.

(51) Int. Cl.
*B66C 1/12* (2006.01)
*B65D 63/10* (2006.01)

(52) U.S. Cl.
USPC .............................. 24/300; 410/97; 410/106

(58) Field of Classification Search
USPC ........... 24/300; 410/97, 100, 118, 96; 87/2, 9, 87/11, 12; 224/493, 572; 57/200, 201, 21; 289/1.2
See application file for complete search history.

(56) References Cited

U.S. PATENT DOCUMENTS

| | | | | |
|---|---|---|---|---|
| 2,372,967 A | * | 4/1945 | Martin | 410/97 |
| 2,514,437 A | | 7/1950 | Bailhe | |
| 3,170,611 A | * | 2/1965 | Gullen | 224/318 |
| 3,173,539 A | * | 3/1965 | Looker | 206/597 |
| 3,181,907 A | | 5/1965 | O'Donnell | |
| 4,036,101 A | | 7/1977 | Burnett | |
| 4,261,404 A | * | 4/1981 | Lew | 152/221 |
| 4,405,034 A | | 9/1983 | Dunne | |
| 4,471,854 A | | 9/1984 | Heilskov | |
| 4,483,471 A | * | 11/1984 | Prosen | 224/314 |
| 4,836,259 A | * | 6/1989 | Lewin et al. | 152/222 |
| 5,193,955 A | * | 3/1993 | Chou | 410/100 |
| 5,209,712 A | * | 5/1993 | Ferri | 482/91 |
| 5,328,310 A | * | 7/1994 | Lockney | 410/97 |
| 5,673,464 A | * | 10/1997 | Whittaker | 24/301 |
| 6,217,268 B1 | * | 4/2001 | Chou | 410/97 |
| 6,322,483 B1 | * | 11/2001 | Rotella | 482/129 |
| 6,419,432 B1 | * | 7/2002 | Chou | 410/97 |
| 6,439,815 B1 | * | 8/2002 | Liu | 410/106 |
| 7,585,197 B1 | * | 9/2009 | Merten | 441/80 |
| 7,909,748 B2 | * | 3/2011 | Calvagne et al. | 482/143 |
| 2010/0193287 A1 | * | 8/2010 | Storm | 182/3 |

* cited by examiner

*Primary Examiner* — Robert J Sandy
*Assistant Examiner* — Rowland D Do

(57) ABSTRACT

A linkable loop rope system that includes at least two loop rope assemblies fastened together by a coupling mechanism operable to releaseably couple the rope assemblies for use in securing large and/or irregular shaped objects on a transport vehicle or a tarp or cover on such objects during transport.

4 Claims, 8 Drawing Sheets

LINKABLE ROPE ASSEMBLY

CROSS REFERENCE TO RELATED APPLICATION

This application is a continuation-in-part of U.S. Ser. No. 12/647,318 entitled "Loop Rope Assembly", filed on Dec. 24, 2009, which application is incorporated herein by reference.

FIELD OF THE INVENTION

The disclosure generally relates to devices for securing an object on a transporting vehicle or the like. More particularly, the disclosure relates to a loop rope assembly which includes a pair of end loops and multiple intermediate loops that can be used as attachment points to secure an object such as during transport of the object, for example. In addition, the disclosure relates to linkable loop rope systems and loop rope assemblies for use as boat protection and mooring devices for marine applications.

BACKGROUND OF THE INVENTION

Various techniques are known for securing objects on a transport vehicle or a tarp or cover on an object such as a boat, for example, during transport of the object. One of the most common methods for securing an object includes tying ropes to attachment points on the transport vehicle and attaching the ropes to the object or tightening the ropes against the object. Bungee cords or the like may be attached to the ropes and to attachment points on the transport vehicle to additionally secure the object on the vehicle. In some applications, tie-down straps fitted with ratchet mechanisms adapted to tighten the straps may be used to secure the object to the vehicle.

One of the drawbacks of using conventional ropes and bungee cords to secure an object on a transport vehicle is that the ropes must be tied securely to prevent the ropes from inadvertently becoming detached during transport. Therefore, proper securing of the object on the vehicle may require knowledge of how to correctly tie the knots in the ropes to prevent the ropes from inadvertently becoming untied. Furthermore, the bungee cords may not be securely attached to the ropes since the ropes typically lack suitable attachment points for the bungee cords between the ends of the ropes. Moreover, the ratchet mechanisms on many tie-down straps may be complicated and difficult to operate. Accordingly, a loop rope assembly is needed which is simple and easy to use and includes a pair of end loops and multiple intermediate loops that can be used as attachment points for bungee cords, ropes or tie-down straps to secure an object on a transport vehicle or a tarp or cover on an object during transport of the object, for example.

For larger and/or irregular shaped cargo, an expandable loop rope system is needed to secure such cargo. Accordingly, a linkable loop rope system is needed which is linkable and expandable, simple and easy to use to secure large and/or irregular shaped objects on a transport vehicle or a tarp or cover on such objects during transport of the object, for example. It is a primary object of this invention to provide such a linkable loop rope system.

For marine applications, a multi-function loop rope assembly is needed for use as a boat fender attachment and use in mooring a boat to a dock for example. It is another object of this invention to provide such a multi-function loop rope assembly.

SUMMARY OF THE INVENTION

The disclosure is generally directed to a loop rope assembly. An illustrative embodiment of the loop rope assembly includes a main rope segment having a plurality of rope strands and first and second ends, a first end loop provided on the first end of the main rope segment, a second end loop provided on the second end of the main rope segment and at least one intermediate loop defined by at least one of the rope strands.

In some embodiments, the loop rope assembly may include a main rope segment having a plurality of rope strands and first and second ends; a first end loop provided on the first end of the main rope segment; a second end loop provided on the second end of the main rope segment and at least one intermediate loop defined by at least one of the rope strands. At least one of the rope strands can be selectively pulled away from remaining ones of the rope strands to define and adjust the size of the at least one intermediate loop.

In some embodiments, the loop rope assembly may include a main rope segment having a pair of rope strands and first and second ends; a first end loop provided on the first end of the main rope segment; a second end loop provided on the second end of the main rope segment; a plurality of spaced-apart strand sleeves provided on the main rope segment; and at least one intermediate loop defined by one of the rope strands between the strand sleeves.

In some embodiments, a linkable loop rope system that may include at least two loop rope assemblies, each of the at least two assemblies having a main rope segment including a plurality of rope strands and first and second ends, a first end loop provided on the first end of the main rope segment, a second end loop provided on the second end of the main rope segment, and at least one in-plane intermediate loop defined by at least one of the rope strands; and a coupling mechanism operable to releaseably couple at least a first one of the at least two rope assemblies to at least a second one of the at least two rope assemblies.

In some embodiments, a linkable loop rope system that may include at least two loop rope assemblies, each of the at least two assemblies including a main rope segment having a plurality of rope strands and first and second ends, a first end loop provided on the first end of the main rope segment, a second end loop provided on the second end of the main rope segment, at least one intermediate loop defined by at least one of the rope strands; and a coupling mechanism operable to releaseably couple at least a first one of the at least two rope assemblies to at least a second one of the at least two rope assemblies, where at least one of the rope strands can be selectively pulled away from remaining ones of the rope strands to define and adjust the size of the at least one intermediate loop.

In some embodiments, a loop rope assembly may include a buoy rope assembly that includes a main rope segment having a plurality of rope strands and first and second ends, a first end loop provided on the first end of the main rope segment; a second end loop provided on the second end of the main rope segment, at least one in-plane intermediate loop defined by at least one of the rope strands; and at least one removable member releaseably coupled to the first end loop, the second end loop, or the at least one in-plane intermediate loop.

BRIEF DESCRIPTION OF THE DRAWINGS

The disclosure will now be made, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Furthermore, there is no intention to be bound by any expressed or implied theory presented in the preceding technical field, background, brief summary or the following detailed description.

Figure 1:
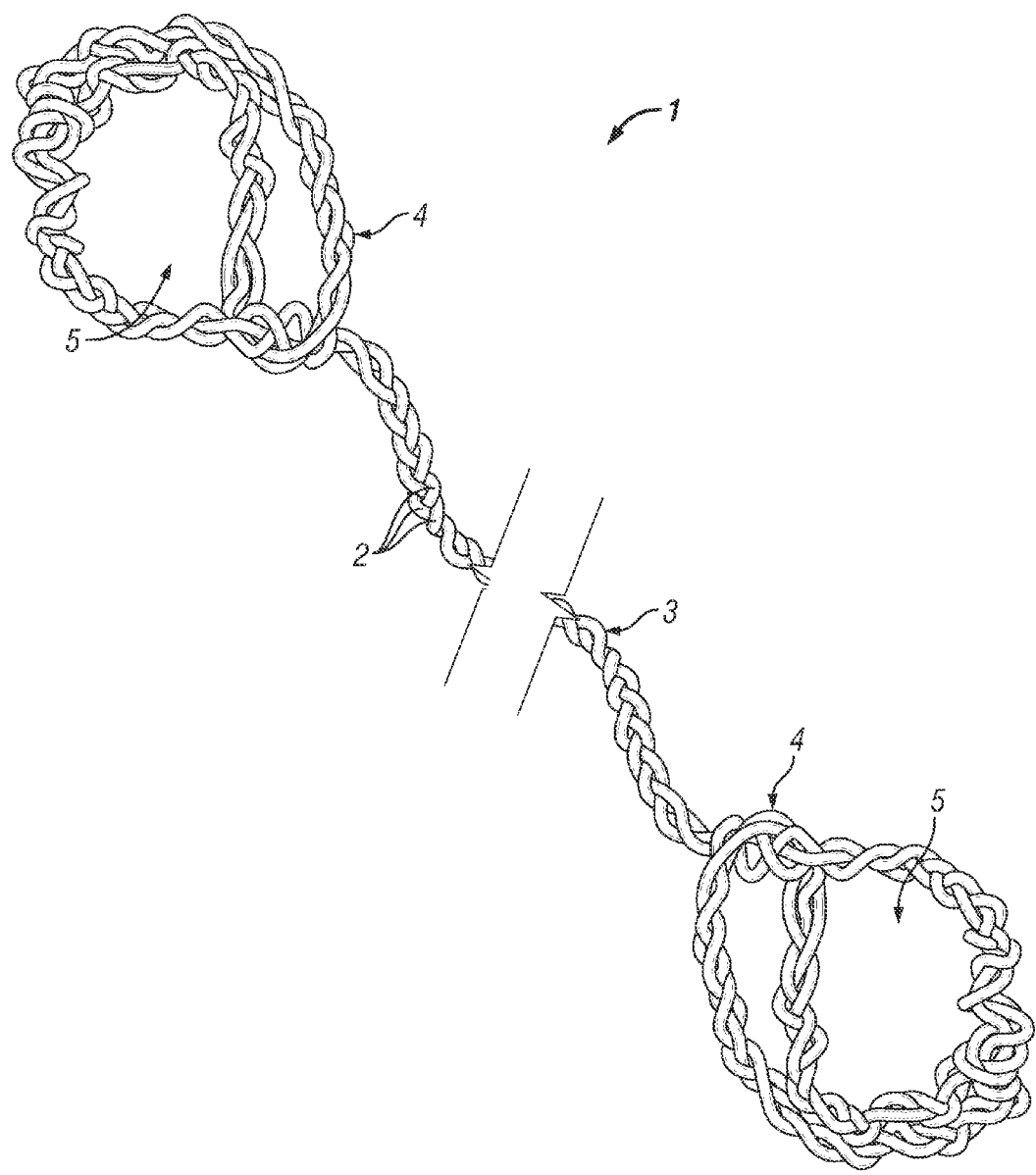
FIG. 1 is a perspective view, partially in section, of an illustrative embodiment of the loop rope assembly.
Figure 2:
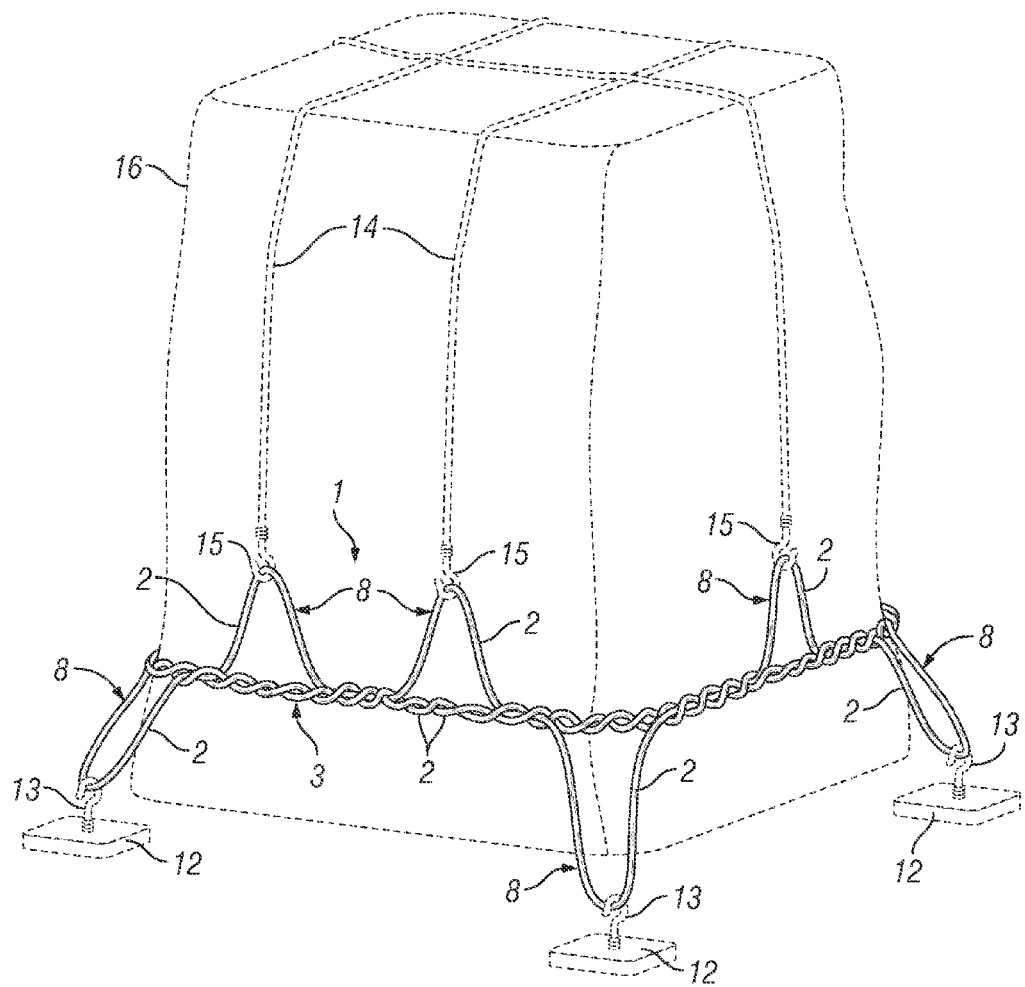
FIG. 2 is a perspective view of an illustrative embodiment of the loop rope assembly in the securing of a load (illustrated in phantom) in an exemplary application of the loop rope assembly.
Figure 3:
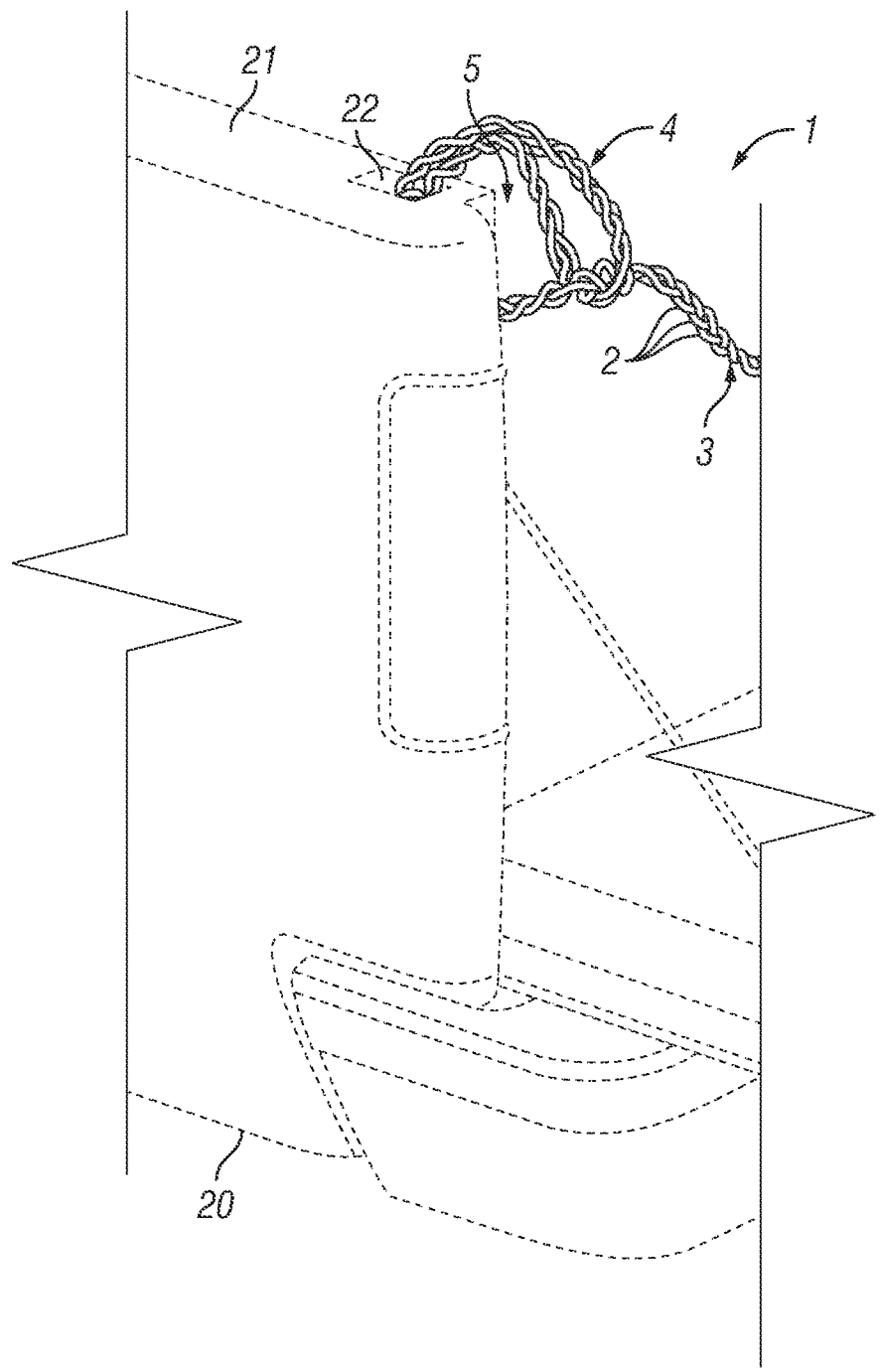
FIG. 3 is a perspective view, partially in section, of an illustrative embodiment of the loop rope assembly, more particularly illustrating attachment of one end of the loop rope assembly to a truck bed side (illustrated in phantom) of a pickup truck in an exemplary application of the loop rope assembly.

Referring initially to FIGS. 1-3 of the drawings, an illustrative embodiment of the loop rope assembly is generally indicated by reference numeral 1. The loop rope assembly 1 may include multiple rope strands 2 which are wound in a braided configuration. In some embodiments, the loop rope assembly 1 may include three braided rope strands 2, as illustrated. In other embodiments, the loop rope assembly 1 may include four or more braided loop strands 2. In some embodiments, the rope strands 2 may be a single continuous rope. Each rope strand 2 may be nylon or other suitable material. The loop rope assembly 1 may include a generally elongated main rope segment 3. A pair of end loops 4 may terminate the respective ends of the main rope segment 3. In some applications, each end loop 4 may be inserted through the opposite end loop 4 to define an attachment loop 5 in one or both ends of the main rope segment 3. As illustrated in FIG. 2, each rope strand 2 can be selectively pulled away from the other rope strands 2 of the main rope segment 3 or either or both of the end loops 4 to define one or multiple intermediate loops 8 each having an adjustable size. Each intermediate loop 8 may be in-plane (the rope strands 2 which define each intermediate loop 8 may be disposed within the same plane).

As illustrated in FIG. 2, in an exemplary application the loop rope assembly 1 can be used to secure a load 16 to a support surface (not illustrated) which in some applications may be a support surface on a transport vehicle (not illustrated) such as a pickup truck or trailer, for example and without limitation. Multiple anchor plates 12, each having an anchor hook 13, may be provided on the support surface in proximity to the load 16. Accordingly, the main rope segment 3 of the loop rope assembly 1 may be extended generally around the lower portion of the load 16 and the end loops 4 (FIG. 1) attached to one of the anchor hooks 13. One of the rope strands 2 may then be pulled away from the other rope strands 2 at the appropriate locations along the length of the main rope segment 3 to form the intermediate loops 8, which may be attached to the remaining anchor hooks 13. One or multiple bungee cords 14 (illustrated in phantom) may then be used to additionally secure the load 16 by forming additional intermediate loops 8 in the main rope segment 3, attaching a bungee cord hook 15 on one end of each bungee cord 14 to an intermediate loop 8 on one side of the load 16, extending the bungee cord 14 over the top of the load 16 and attaching the bungee cord hook 15 on the other end of the bungee cord 14 to an intermediate loop 8 on the opposite side of the load 16. Thus, the load 16 is secured for transport of the load 16 on the transport vehicle or for other purposes. The load 16 can be unsecured, as desired, by detaching each bungee cord 14 from the corresponding pair of intermediate loops 8; detaching the intermediate loops 8 from the respective anchor hooks 13; and detaching the end loops 4 (FIG. 1) from the anchor hook 13.

As illustrated in FIG. 3, in some applications of the loop rope assembly 1, each end loop 4 may be inserted through the opposite end loop 4 to define an attachment loop 5 in one or both ends of the main rope segment 3. The attachment loop or loops 5 may be used to fasten the loop rope assembly 1 to one or more attachment points on a transport vehicle or on the object or load which is to be secured. Accordingly, as illustrated in FIG. 3, in an exemplary application, a first end loop 4 on one end of the main rope segment 3 can be extended through a conventional fastener opening 22 which is provided in a truck bed side 21 of a pickup truck 20. The opposite end loop 4 (FIG. 1) can then be extended through the first end loop 4 to form the attachment loop 5 which secures the loop rope assembly 1 to the truck bed side 21, as illustrated. The end loop 4 on the unsecured end of the main rope segment 3 can be fastened to another attachment point (not illustrated) on the pickup truck 20 or to the object or load (not illustrated) which is to be secured. Additional attachment points for bungee cords 14 (FIG. 2) or the like can be provided by forming the intermediate loops 8 in the main rope segment 3 and/or in either or both of the end loops 4, as was heretofore described with respect to FIG. 2.

Figure 4:
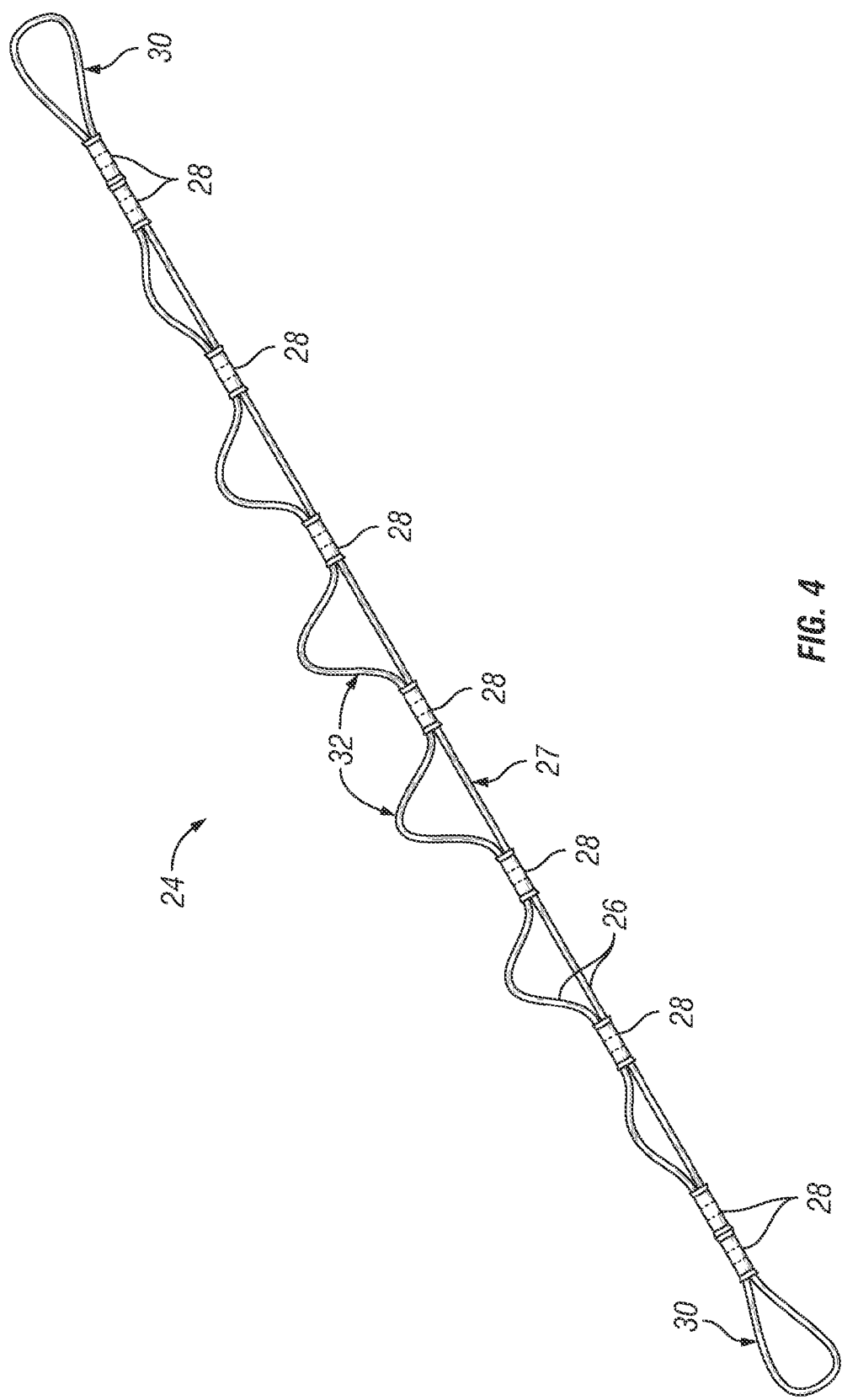
FIG. 4 is a perspective view of an alternative illustrative embodiment of the loop rope assembly.
Figure 5:
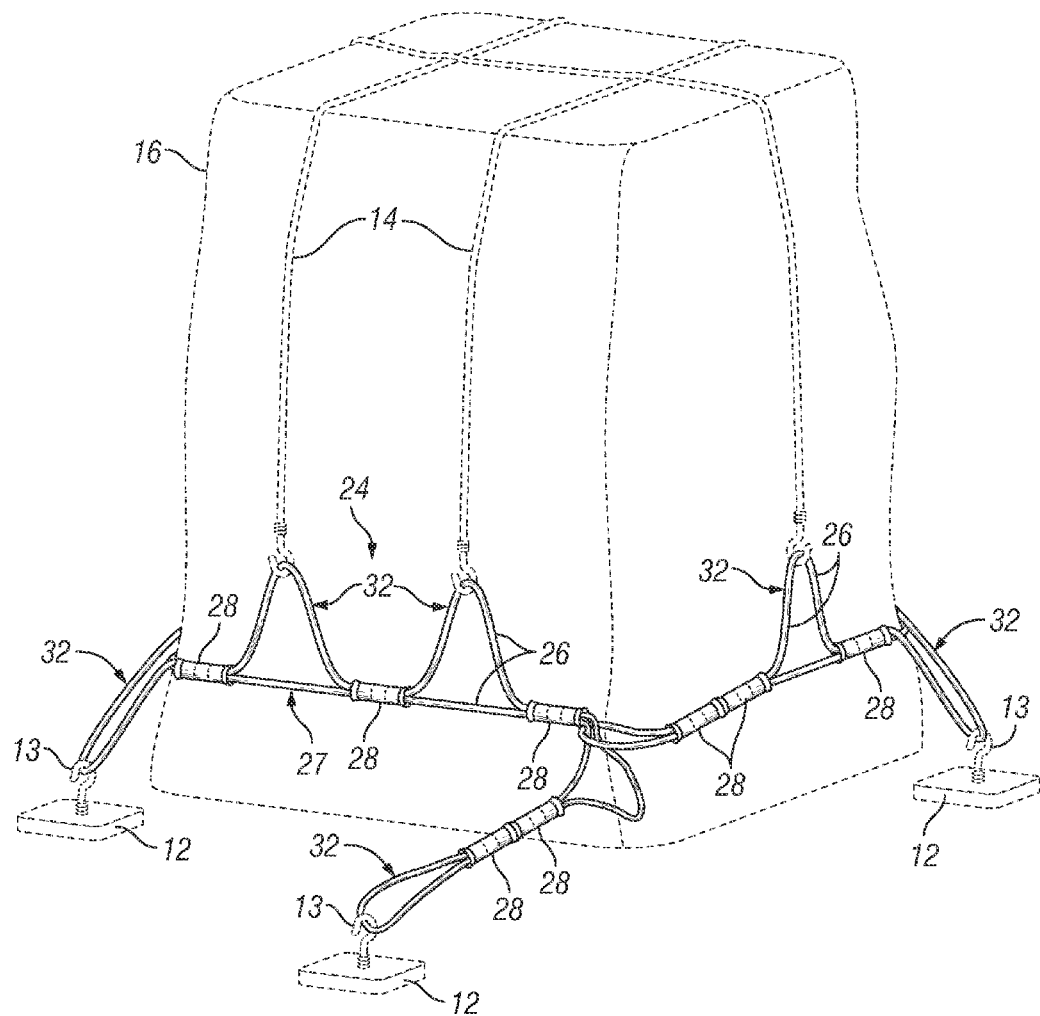
FIG. 5 is a perspective view of the illustrative embodiment of the loop rope assembly illustrated in FIG. 4 in the securing of a load (illustrated in phantom) in an exemplary application of the loop rope assembly.
Figure 6:
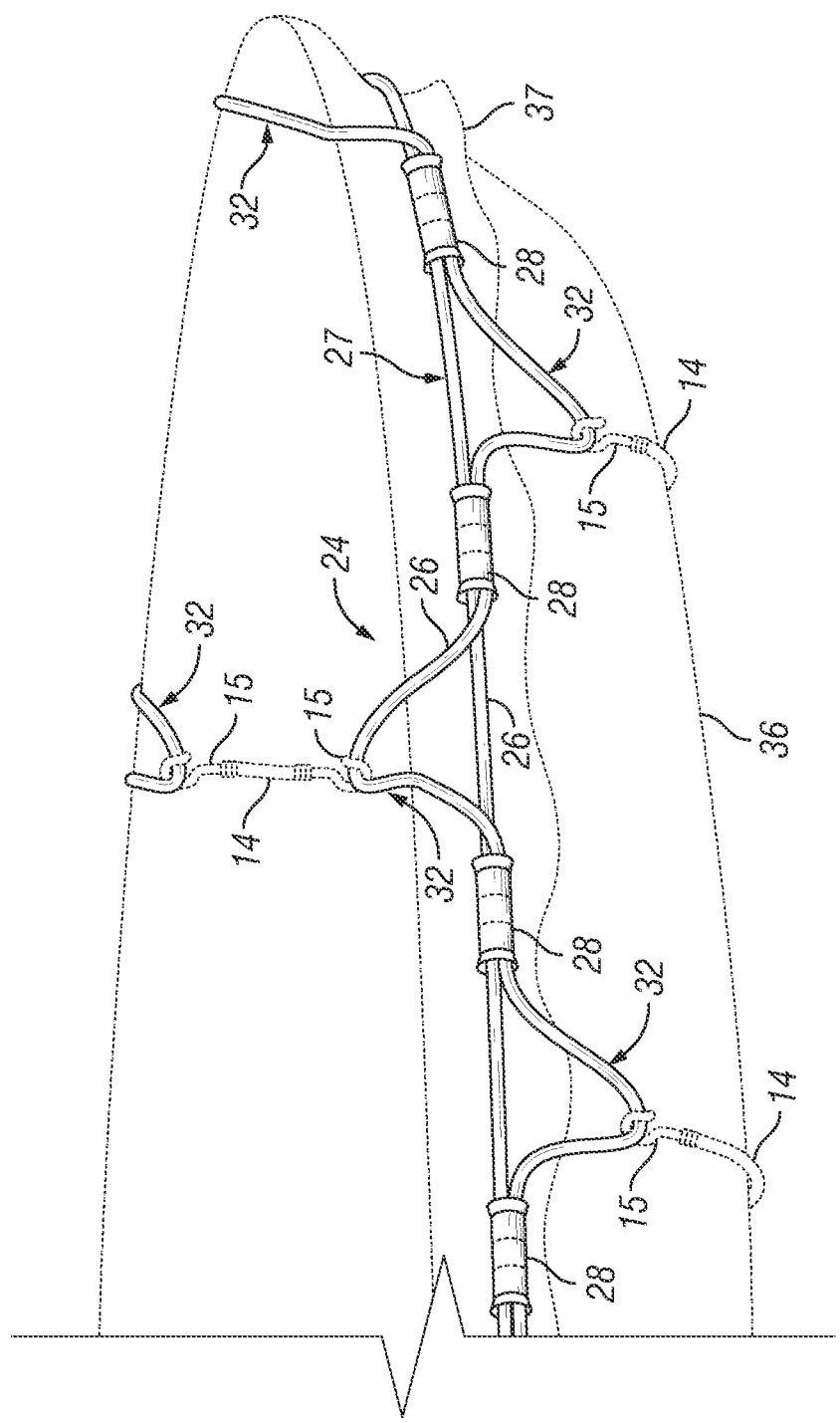
FIG. 6 is a perspective view, partially in section, of the illustrative embodiment of the loop rope assembly illustrated in FIG. 4 in the securing of a tarp or boat cover (illustrated in phantom) on a boat (illustrated in phantom) in an exemplary application of the loop rope assembly.

Referring next to FIGS. 4-6 of the drawings, another illustrative embodiment of the loop rope assembly is generally indicated by reference numeral 24. The loop rope assembly 24 may include a pair of adjacent rope strands 26 which define a main rope segment 27 and a pair of end loops 30 at respective ends of the main rope segment 27. Each rope strand 26 may be nylon or other suitable material. In some embodiments, the rope strands 26 may be a single continuous rope. The rope strands 26 may extend through a pair of adjacent openings (not illustrated) provided in each of multiple strand sleeves 28. The strand sleeves 28 may be provided at spaced intervals with respect to each other along the main rope segment 27. Accordingly, between each pair of adjacent strand sleeves 28, one rope strand 26 can be selectively pulled through the strand sleeves 28 and away from the other rope strand 26 to form an intermediate loop 32 having an adjustable size. Each intermediate loop 32 may be in-plane (the rope strands 26 which define each intermediate loop 32 may be disposed within the same plane). One or multiple strand sleeves 28 may be provided at each end of the main rope segment 27 to define the end loop 30 in each corresponding end of the main rope segment 27.

As illustrated in FIG. 5, in an exemplary application the loop rope assembly 24 can be used to secure a load 16 to a support surface (not illustrated) which in some applications may be a support surface on a transport vehicle (not illustrated) such as a pickup truck or trailer, for example and without limitation. Multiple anchor plates 12, each having an anchor hook 13, may be provided on the support surface in proximity to the load 16. Accordingly, the main rope segment 27 of the loop rope assembly 24 may be extended generally around the lower portion of the load 16 and the end loops 30 (FIG. 4) attached to one of the anchor hooks 13. One of the rope strands 26 may be pulled through a pair of adjacent strand sleeves 28 and away from the other rope strand 26 at the appropriate locations along the length of the main rope segment 27 to form the intermediate loops 32, which may be attached to the remaining anchor hooks 13. One or multiple bungee cords 14 (illustrated in phantom) may then be used to additionally secure the load 16 by forming additional intermediate loops 32 in the main rope segment 27, attaching a bungee cord hook 15 on one end of each bungee cord 14 to an intermediate loop 32 on one side of the load 16, extending the bungee cord 14 over the top of the load 16 and attaching the bungee cord hook 15 on the other end of the bungee cord 14 to an intermediate loop 32 on the opposite side of the load 16. Thus, the load 16 is secured for transport of the load 16 on the transport vehicle or for other purposes. The load 16 can be unsecured; as desired, by detaching each bungee cord 14 from the corresponding pair of intermediate loops 32; detaching the intermediate loops 32 from the respective anchor hooks 13; and detaching the end loops 30 (FIG. 4) from the anchor hook 13.

Another exemplary application of the loop rope assembly 24 is illustrated in FIG. 6. Accordingly, the loop rope assembly 24 can be used to secure a tarp or boat cover 37 on a boat 36 (illustrated in phantom). After the boat cover 37 is placed over the boat 36, the main rope segment 27 may be extended around the edges of the boat cover 37 and against the boat 36. The end loops 30 (FIG. 4) on the respective ends of the main rope segment 27 may then be attached to suitable attachment points (not illustrated) provided on the boat 36 or on a trailer (not illustrated) on which the boat 36 is supported. Intermediate loops 32 may be formed at selected points along the main rope segment 27 on each side of the boat 36 to provide attachment points for 14 which can be used to additionally secure the boat cover 37 on the boat 36. Thus, the bungee cord hook 15 on one end of a bungee cord 14 can be attached to an intermediate loop 36 on one side of the boat 36; the bungee cord 14 extended over the top of the boat cover 37; and the bungee cord hook 15 on the other end of the bungee cord 14 attached to an intermediate loop 36 on the other side of the boat 36. The bungee cord hook 15 on one end of another bungee cord 14 can be attached to an intermediate loop 36 on one side of the boat 36; the bungee cord 14 extended beneath the boat 36; and the bungee cord hook 15 on the other end of the bungee cord 14 attached to an intermediate loop 36 on the other side of the boat 36. The adjacent bungee cords 14 which extend over the boat cover 37 and under the boat 36 may alternate with one another along the length of the boat 36. Accordingly, the boat cover 37 is securely attached to the boat 36 for transport and/or storage of the boat 36. The loop rope assembly 24 can be selectively detached from the boat 36 by detaching the bungee cord hooks 15 of the bungee cords 14 from the intermediate loops 32 and detaching the end loops 30 (FIG. 4) from the attachment points (not illustrated) on the boat 36 or trailer (not illustrated) on which the boat 36 is supported.

Figure 7:
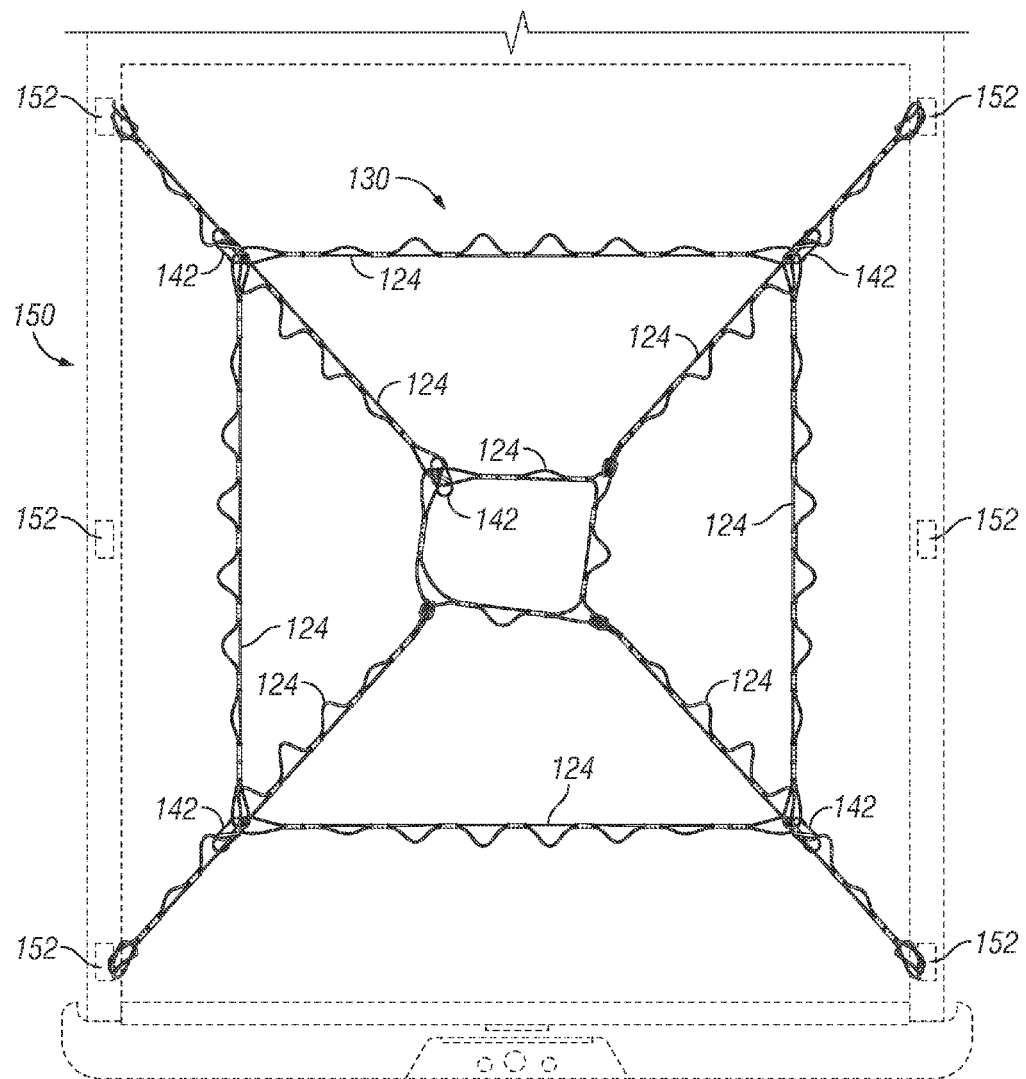
FIG. 7 is a perspective view of an alternative illustrative embodiment of a linkable loop rope assembly for use in securing cargo on vehicles (illustrated in phantom) in an exemplary application of the loop rope assembly.

Referring next to FIGS. 4 and 7 of the drawings, another illustrative embodiment of the linkable loop rope system is generally indicated by reference numeral 120. The linkable loop rope system 120 may include at least two loop rope assemblies 124. Each loop rope assembly, as hereinbefore described in reference to FIG. 4, comprises a continuous rope segment 27 and a pair of end loops 30 at respective ends of the continuous rope segment 27. Continuous rope segment 27 preferably comprises a material selected from the group consisting of rubber, bungee cord, surgical tubing, and elastic therapy straps. The continuous segment 27 may extend through a pair of adjacent openings (not illustrated) provided in each of multiple sleeves 28. Preferably the sleeves comprise crimped aluminum or copper feral that optionally are covered by heat shrunk rubber for comport. The sleeves 28 may be provided at spaced intervals with respect to each other along the continuous rope segment 27. Accordingly, between each pair of adjacent sleeves 28, a portion of the continuous rope segment 27 can be selectively pulled through the sleeves 28 to form an intermediate loop 32 having an adjustable size. Each intermediate loop 32 may be in-plane (the continuous rope segment 27 which defines each intermediate loop 32 may be disposed within the same plane). One or multiple sleeves 28 may be provided at each end of the continuous rope segment 27 to define the end loop 30 in each corresponding end of the continuous rope segment 27.

The linkable loop rope system 130 may include a one or more removable coupling mechanisms 142 fastened to and end loop 30 (FIG. 4) or to an intermediate loop 32 (FIG. 4) by way of a fastening means 142 such as a clip or carabiner. In operation, the linkable loop rope system 124 is secured to a vehicle bed 150 (shown in phantom) at multiple points by for example, fastening an end loops 30 to openings 152 in the bed 150 utilizing a fastening means such as a clip or carabineer or by fastening the assembly 24 to an opening 152 by looping the assembly 24 through an end loop 30 as illustrated in FIG. 7. Any number of assemblies 24 may be linked together to create any size linkable loop rope system 130.

The unique function of the linkable loop rope system allows a user to secure irregular sized loads that the unlinked loop rope assemblies are not well-suited for. The linkable loop rope system functions as an expandable cargo net irrespective of the size or shape of the load. It provides for multi-point attachment when fastening or strapping down large loads.

Figure 8:
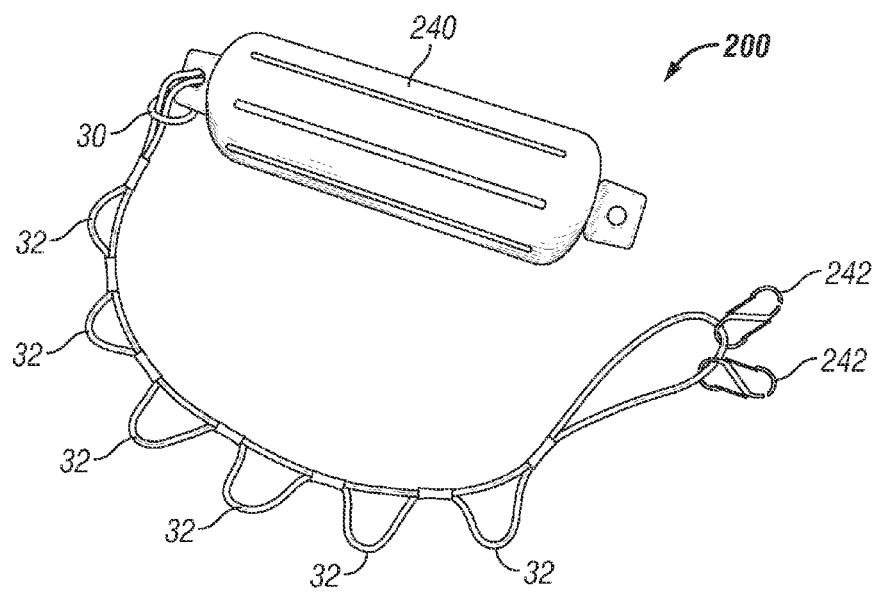
FIG. 8 is a perspective view of an alternative illustrative embodiment of the loop rope assembly that includes a removable member for use as a boat protection and mooring device.
Figure 9:
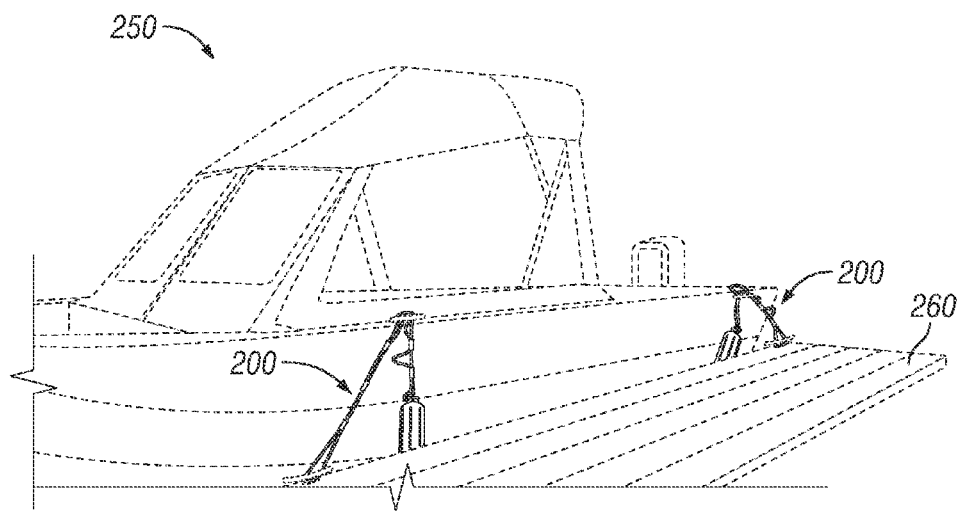
FIG. 9 is a perspective view of the embodiment of the loop rope assembly in FIG. 8, illustrating use as a boat fender between a boat and dock (both shown in phantom), according to the present invention.

Referring now to FIGS. 4, 8, and 9 of the drawings, another illustrative embodiment of the buoy rope assembly is generally indicated by reference numeral 200. The buoy rope assembly 200 may include a loop rope assembly 224, and at least one removable member 240 releasably coupled to an end loop 30 or intermediate loop 32. Preferably, assembly 200 includes a coupling mechanism 242 to releasably couple the removable member 240 to an end loop 30 or the at least one in-plane intermediate loop 32. Coupling mechanism 242 can be for example a clip or carabineer.

In a preferred embodiment, referring specifically to FIG. 9 of the drawings, the buoy rope assembly can be utilized to moor a marine craft 250 to a dock 260 (both craft and dock shown in phantom). Removable member 240 functions as a boat fender or bumper used to keep boats from banging into docks or into each other. Preferably, removable member 240 is constructed of a rubber or plastic hull filled with air or foam. The unique adjustability of the buoy rope assembly allows a user to place the member 240 at the appropriate height by selecting the corresponding end loop or intermediate loop for attachment. The remaining length of assembly rope, allows the securing of the craft 250 to dock 260 with appropriate tension.

It will be appreciated by those skilled in the art that the loop rope assemblies of the disclosure are effective for tying down tarps or covers or light- to medium-duty loads on a support for transport, storage or other purposes. The loop rope assembly may enable a user to maintain a tight fit of the assembly without the use of hooks or ratcheting-type devices. One size of the loop rope assembly may fit any desired application. Moreover, a user need not have the knowledge or ability to tie secure knots in order to facilitate securing of a cover or load. Using the loop rope assembly, one user can easily secure virtually any size load without assistance. Under circumstances in which a greater length of the loop rope assembly is needed, a pair of the assemblies can be looped together for the purpose.

While the preferred embodiments of the disclosure have been described above, it will be recognized and understood that various modifications can be made in the disclosure and the appended claims are intended to cover all such modifications which may fall within the spirit and scope of the disclosure.

What is claimed is:

1. A linkable loop rope system, comprising:
   at least two loop rope assemblies, each of the at least two assemblies comprising:
      a main rope segment having a plurality of rope strands and first and second ends;
      a first end loop provided on the first end of the main rope segment;
      a second end loop provided on the second end of the main rope segment;
      at least one sinusoidal intermediate loop defined by at least one of the rope strands; and
      a coupling mechanism operable to releasably couple at least a first one of the at least two rope assemblies to at least a second one of the at least two rope assemblies;
      wherein at least one of the rope strands can be selectively pulled away from and slidably displaced relative to remaining ones of the rope strands to define and adjust the size of the at least one intermediate loop.

2. The linkable loop rope system of claim 1 further comprising at least one attachment loop provided in at least one of the first end and the second end of the main rope segment.

3. The linkable loop rope system of claim 2 wherein the at least one attachment loop comprises a first attachment loop and a second attachment loop provided in the first end and the second end, respectively, of the main rope segment.

4. The linkable loop rope system of claim 1 wherein the at least one intermediate loop comprises a plurality of intermediate loops.

* * * * *